(12) United States Patent
Ahmed

(10) Patent No.: US 12,454,461 B1
(45) Date of Patent: Oct. 28, 2025

(54) FABRICATION OF CAB2O4/CO3(BO3)2/PBO2/CO3O4 NANOCOMPOSITE MATERIAL USING PECHINI SOL-GEL METHOD

(71) Applicant: IMAM MOHAMMAD IBN SAUD ISLAMIC UNIVERSITY, Riyadh (SA)

(72) Inventor: Ehab Abdelhamed Abdelrahman Ahmed, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/044,755

(22) Filed: Feb. 4, 2025

(51) Int. Cl.
| | | |
|---|---|---|
| C01B 35/12 | (2006.01) |
| C01G 21/08 | (2006.01) |
| C01G 51/04 | (2025.01) |
| C02F 1/28 | (2023.01) |
| C02F 1/32 | (2023.01) |
| C02F 101/10 | (2006.01) |
| C02F 101/30 | (2006.01) |

(52) U.S. Cl.
CPC .......... *C01B 35/126* (2013.01); *C01B 35/127* (2013.01); *C01G 21/08* (2013.01); *C01G 51/04* (2013.01); *C02F 1/281* (2013.01); *C02F 1/32* (2013.01); *C01P 2002/60* (2013.01); *C01P 2002/72* (2013.01); *C01P 2004/03* (2013.01); *C01P 2004/24* (2013.01); *C01P 2004/51* (2013.01); *C02F 2101/10* (2013.01); *C02F 2101/30* (2013.01)

(58) Field of Classification Search
None
See application file for complete search history.

(56) References Cited

U.S. PATENT DOCUMENTS

| | | | | |
|---|---|---|---|---|
| 2003/0065111 | A1* | 4/2003 | Yoshimura | C08F 10/00 |
| | | | | 502/118 |
| 2007/0167554 | A1* | 7/2007 | Ryang | B01J 21/08 |
| | | | | 524/492 |
| 2018/0099487 | A1* | 4/2018 | Koh | C03C 3/093 |

FOREIGN PATENT DOCUMENTS

| | | | |
|---|---|---|---|
| CN | 108517547 A | 9/2018 | |
| CN | 108728872 A | * 11/2018 | ............. C25D 15/00 |
| CN | 114261995 A | 4/2022 | |
| CN | 118281188 A | 7/2024 | |

OTHER PUBLICATIONS

English translation of CN-108728872-A Description. (Year: 2018).*

(Continued)

*Primary Examiner* — Anthony J Zimmer
*Assistant Examiner* — Zachary John Baum
(74) *Attorney, Agent, or Firm* — Oblon, McClelland, Maier & Neustadt, L.L.P.

(57) ABSTRACT

A porous particulate nanocomposite material includes, as determined by X-ray diffraction, an orthorhombic $CaB_2O_4$ crystalline phase; an orthorhombic $Co_3(BO_3)_2$ crystalline phase; an orthorhombic $PbO_2$ crystalline phase; and, a cubic $Co_3O_4$ crystalline phase. The porous particulate nanocomposite material is in the form of particles having a matrix phase with a smooth surface and in which sharp-edged plates are embedded and protrude.

19 Claims, 5 Drawing Sheets

(56) References Cited

OTHER PUBLICATIONS

Arda Aytimur, et al., "Synthesis and characterization of boron doped bismuth-calcium-cobalt oxide nanoceramic powders via polymeric precursor technique", Ceramics International, vol. 39, Issue 2. Mar. 2013, pp. 911-916 (6 pages).

T Satyanarayana, et al., "Structural investigations on $PbO$—$Sb_2O_3$—$B_2O_3$;$CoO$ glass ceramics by means of spectroscopic and dielectric studies", Journal of Physics: Condensed Matter, vol. 21, No. 24, May 12, 2009 (2 pages).

\* cited by examiner

FABRICATION OF CAB2O4/CO3(BO3)2/PBO2/CO3O4 NANOCOMPOSITE MATERIAL USING PECHINI SOL-GEL METHOD

BACKGROUND

Technical Field

The present disclosure is directed to nanocomposites, more particularly, to $CaB_2O_4/Co_3(BO_3)_2/PbO_2/Co_3O_4$ nanocomposites fabricated using Pechini sol-gel method.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The background of this invention draws on advances and limitations in the synthesis and applications of oxide-based nanocomposites, particularly $CaB_2O_4/Co_3(BO_3)_2/PbO_2/Co_3O_4$ nanocomposites. Existing research highlights the use of calcium borate, cobalt borate, lead oxide, and cobalt oxide in various functional materials due to their unique chemical and physical properties. However, many existing methods for synthesizing these compounds involve complex, time-intensive procedures that often yield materials with inconsistent particle sizes and limited stability. Current studies on oxide nanocomposites emphasize their application in catalysis, environmental remediation, and energy storage, yet the use of the nanocomposites frequently face challenges, such as low thermal stability, degradation over time, and limited uniformity in the crystalline structures.

It is proposed that the Pechini sol-gel method may be applied to achieve a combined nanocomposite of $CaB_2O_4$, $Co_3(BO_3)_2$, $PbO_2$, and $Co_3O_4$, which nanocomposite can deliver enhanced stability and desirable functional properties in challenging applications.

Accordingly, an object of the present disclosure is to address the limitations of the prior art by developing a nanocomposite with targeted chemical stability and composition, using the Pechini sol-gel method to ensure uniformity and control over the nanocomposite's crystalline structure and functionality.

SUMMARY

In an exemplary embodiment, a porous particulate nanocomposite material is described. The porous particulate nanocomposite material, as determined by X-ray diffraction, comprises: an orthorhombic $CaB_2O_4$ crystalline phase; an orthorhombic $CO_3(BO_3)_2$ crystalline phase; an orthorhombic $PbO_2$ crystalline phase; and, a cubic $Co_3O_4$ crystalline phase. The porous particulate nanocomposite material is in the form of particles having a matrix phase with a smooth surface and in which sharp-edged plates are embedded and protrude. The atomic concentration of boron in the porous particulate nanocomposite material is from about 1 to about 10 atom %, the atomic concentration of lead is from about 1 to about 10 atom %, the atomic concentration of calcium is from about 5 to about 20 atom %, and the atomic concentration of cobalt is from about 5 to about 20 atom %, based on the total number of atoms in the nanocomposite material.

In some embodiments, the average crystallite size of the porous particulate nanocomposite material, as determined by X-ray diffraction, is about 65 to about 70 nm.

In some embodiments, the porous particulate nanocomposite material has an average crystallite size, as determined by X-ray diffraction, is about 68 to about 70 nm.

In some embodiments, the porous particulate nanocomposite material has a multimodal particle size distribution.

In some embodiments, the porous particulate nanocomposite material has a multimodal particle size distribution and comprises, as determined by Scanning Electron Microscopy: plate-like particles having a first median volume particle size; granular particles having a second median volume particle size which is less than said first median volume particle size; and, agglomerates thereof.

In some embodiments, the plate-like particles include at least one of $CaB_2O_4$ and $CO_3(BO_3)_2$.

In an exemplary embodiment, a method for preparing the porous particulate nanocomposite is described. The method comprises: forming an aqueous mixture by adding an aqueous solution of a chelating agent into an aqueous solution of a calcium salt, a cobalt salt, lead salt and boric acid; adding a polyol into the aqueous mixture to form a gel; heating the gel under stirring at a temperature of from about 200 to about 400° C. for a sufficient duration to form a dry powder; and, calcining the dry powder at a temperature of from about 500 to about 800° C. to form the nanocomposite material.

In some embodiments, the aqueous solution of the chelating agent is added in a dropwise manner into the aqueous solution of the calcium salt, the cobalt salt, the lead salt and boric acid.

In some embodiments: the calcium salt is selected from the group consisting of calcium sulfate ($CaSO_4$), calcium nitrate ($Ca(NO_3)_2$), calcium chloride ($CaCl_2$) and calcium acetate ($Ca(CH_3COO)_2$); the cobalt salt is selected from the group consisting of cobalt sulfate ($CoSO_4$), cobalt nitrate ($Co(NO_3)_2$), cobalt chloride ($CoCl_2$) and cobalt acetate ($Co(CH_3COO)_2$); and, the lead salt is selected from the group consisting of lead sulfate ($PbSO_4$), lead nitrate ($Pb(NO_3)_2$), lead chloride ($PbCl_2$) and lead acetate ($Pb(CH_3COO)_2$).

In some embodiments, the calcium salt is calcium nitrate ($Ca(NO_3)_2$), the cobalt salt is cobalt nitrate ($Co(NO_3)_2$), and the lead salt is lead nitrate ($Pb(NO_3)_2$).

In some embodiments, the chelating agent comprises at least one hydroxyalkyl carboxylic acid selected from the group consisting of citric acid, tartaric acid, malic acid, mandelic acid and 12-hydroxystearic acid.

In some embodiments, the chelating agent comprises or consists of tartaric acid.

In some embodiments, the polyol is added in a dropwise manner into the aqueous mixture.

In some embodiments, the polyol has a number average molecular weight (Mn) of from about 200 to about 5000 g/mol. and an hydroxyl number of from about 25 to about 500 mg KOH/g.

In some embodiments, the polyol is selected from the group consisting of: polyester polyols; polyether polyols; poly(ether-ester) polyols; poly(alkylene carbonate) polyols; and, mixtures thereof.

In some embodiments, the polyol comprises a polyoxy($C_2$-$C_3$)alkylene polyol.

In some embodiments, the polyol includes a polyoxy($C_2$-$C_3$)alkylene polyol and has a number average molecular weight of from about 200 to about 5000 g/mol. and a hydroxyl number of from about 25 to about 500 mg KOH/g.

In an exemplary embodiment, a method of immobilizing inorganic contaminants disposed in an aqueous medium is described. The method includes contacting the aqueous medium with the porous particulate nanocomposite material.

In some embodiments, a method of degrading organic pollutants disposed in an aqueous medium is described. The method includes contacting the aqueous medium under actinic irradiation with the porous particulate nanocomposite material.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
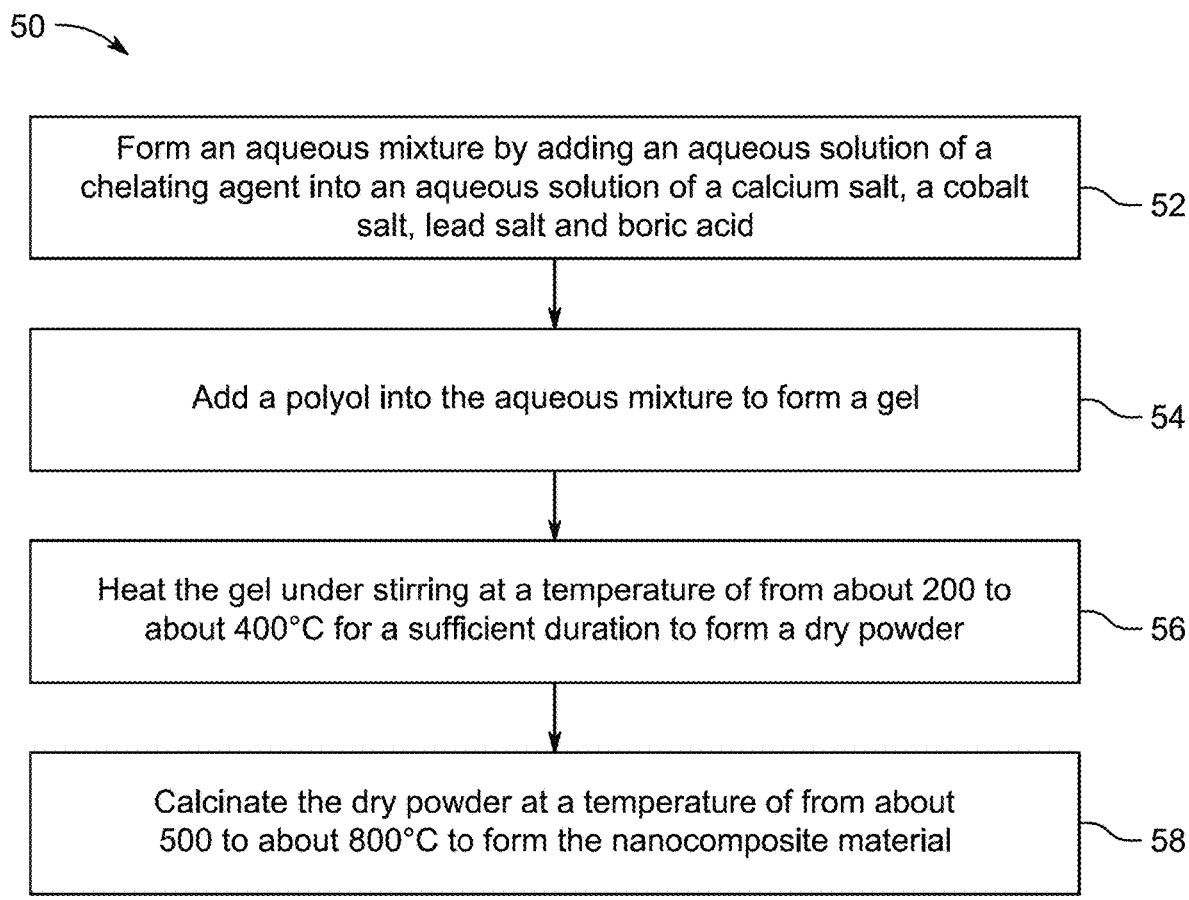
FIG. 1A is a method flowchart for making a $CaB_2O_4/Co_3(BO_3)_2/PbO_2/Co_3O_4$ nanocomposite material, according to certain embodiments.

Embodiments of the present invention will now be described more fully hereinafter with reference to the accompanying drawings, wherever applicable, in which some, but not all, embodiments of the disclosure are shown.

When describing the present disclosure, the terms used are to be construed in accordance with the following definitions, unless a context dictates otherwise.

As used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

As used herein, the term "average crystallite size" refers to the mean size of the crystalline domains or particles within a material. It is typically determined using X-ray diffraction (XRD) analysis, where the broadening of diffraction peaks is related to the size of the crystallites. The average crystallite size provides insight into the degree of crystallinity and the structural characteristics of the material. It is commonly expressed in nanometers (nm) and reflects the typical dimensions of the crystalline regions in the material, excluding any amorphous regions or defects.

As used herein, the term "atomic concentration" refers to the proportion or percentage of a specific element in a material, calculated based on the number of atoms of that element relative to the total number of atoms present in the material. It is typically expressed as a percentage (%) or as an atomic fraction. This measurement may be determined using the exemplary techniques of X-ray fluorescence (XRF), energy-dispersive X-ray spectroscopy (EDX), or inductively coupled plasma mass spectrometry (ICP-MS). Where stated herein, atomic concentration is determined using energy-dispersive X-ray spectroscopy (EDX).

As used herein, number average molecular weight (Mn) and weight average molecular weight (Mw) are determined by gel permeation chromatography (GPC) with tetrahydrofuran (THF) as the eluent in accordance with DIN 55672-1:2007-08.

As used herein, the term 'particle' refers to a small object that acts as a whole unit with regard to its transport and properties. As used herein, 'nanoparticles'—sometimes contracted herein to NPs—refers to particles having a particle size of 1 nanometer (nm) to 1000 nm.

Unless otherwise stated, the term 'particle size' refers to the largest axis of the particle. In the case of a generally spherical particle, the largest axis is the diameter.

The term 'median volume particle size' (Dv50), as used herein, refers to a particle size corresponding to 50% of the volume of the sampled particles being greater than and 50% of the volume of the sampled particles being smaller than the recited Dv50 value. Similarly, if used, the term 'Dv90' refers to a particle size corresponding to 90% of the volume of the sampled particles being smaller than and 10% of the volume of the sampled particles being greater than the recited Dv90 value. Particle size is determined herein by Scanning Electron Microscopy (SEM).

As used herein, '$C_1$-$C_n$ alkyl' group refers to a monovalent group that contains from 1 to n carbons atoms, that is a radical of an alkane and includes straight-chain and branched organic groups. As such, a '$C_1$-$C_4$ alkyl' group refers to a monovalent group that contains from 1 to 4 carbons atoms, that is a radical of an alkane and includes straight-chain and branched organic groups. Examples of alkyl groups include, but are not limited to: methyl; ethyl; propyl; isopropyl; n-butyl; isobutyl; sec-butyl; and, tert-butyl. In the present disclosure, such alkyl groups may be unsubstituted or may be substituted with one or more halogen. Where applicable for a given moiety (R), a tolerance for one or more non-halogen substituents within an alkyl group will be noted in the specification.

The term 'alkylene' refers to a divalent radical derived from an alkyl group as defined above.

The term 'polyoxyalkylene'—alternatively referenced as polyalkylene oxide—refers herein to an aliphatic polyether which is built from repeated —O-A- units, wherein A is alkylene, for instance $C_2$-$C_5$ alkylene. The term 'polyoxy($C_2$-$C_3$)alkylene' encompasses polyoxyethylene, polyoxypropylene and poly(oxyethylene-co-oxypropylene).

The term 'polyol' as used herein shall include diols and higher functionality hydroxyl compounds. The term 'polyether polyol' refers to a compound, which may be linear or branched, that contains at least two ether groups and at least two hydroxyl groups. The term 'polyester polyol' references a polymeric compound, which may be linear or branched, that contains at least two ester linkages and at least two hydroxyl groups. Correspondingly, the term 'poly(ether-ester) polyol' refers to a polyol containing both ether linkages (C—O—C) and ester linkages (R—COO—R) within its structure.

The term 'hydroxyl number' as used herein is defined as the mass in milligrams of potassium hydroxide required to neutralize the acetic acid taken up on acetylation of one gram of a chemical substance that contains free hydroxyl groups. Where stated, the hydroxyl number is determined in accordance with ASTM D4274-11.

The term 'dropwise' as used herein means that one discrete drop or aliquot of a liquid, irrespective of its size or volume, is administered at a time. Discrete drops or aliquots are administered consecutively: they may be provided at regular intervals, at irregular intervals or both such intervals may be applied over the course of administration of the liquid. Further, the volume of an aliquot or drop may be independently determined and thus may be varied over the course of administration of the liquid. Exemplary devices for dropwise addition of liquids include syringes and columns.

As used herein, the term 'Pechini sol-gel method' refers to the synthetic process used to produce metal oxide and composite materials by forming a sol through the polymerization of metal salts in a solvent, typically with the help of a chelating agent and an organic compound such as a polyol. The sol is then converted into a gel by the addition of a gelling agent, and, upon heating, the gel undergoes a transformation into a solid metal oxide or composite material.

The term 'sol' as used herein, refers to a colloidal suspension of solid particles in a continuous liquid medium.

As used herein, the term 'gel' refers to a viscoelastic or semi-solid phase that may form when a sol undergoes a transition to a more structured, three-dimensional network. This transition may occur through polymerization or cross-linking, typically facilitated by the addition of a gelling agent or by partial evaporation of the liquid medium of the sol. The result is a gel in which the liquid phase is entrapped within a solid network, creating a material that is free-standing or self-supporting—in that its yield value is greater than the sheer stress imposed by gravity—but which is still composed of a significant amount of liquid.

An orthorhombic crystalline phase refers to a crystal structure having three mutually perpendicular axes of unequal lengths (a b c). This means the crystal lattice forms a rectangular prism where the edges represent the three axes, all intersecting at 90-degree angles ($\alpha=\beta=\gamma=90°$).

A cubic crystalline phase refers to a crystal structure where the unit cell is shaped like a cube, with three equal-length axes that are perpendicular to each other (at 90° angles). In this crystal system, the atoms or ions are arranged in a repeating pattern within the cubic lattice. The cubic crystalline structure is highly symmetric, possessing four threefold rotational axes and three fourfold rotational axes, permitting rotations of 90° around its specific axes and rotations of 120° about the body diagonals of the cube, while maintaining the same structure.

The term "actinic radiation" includes light with wavelengths of electromagnetic radiation ranging from the ultra-violet ("UV") light range, through visible light range, and into the infrared range. Actinic radiation generally has a wavelength of from 150 to 2000 nm.

The present disclosure is intended to include all hydration states of a given compound or formula, unless otherwise noted or when heating a material.

Aspects of this disclosure pertain to a $CaB_2O_4/Co_3(BO_3)_2/PbO_2/Co_3O_4$ nanocomposite prepared using a modified Pechini sol-gel method. The modified Pechini sol-gel method ensures high homogeneity and controlled composition of the nanocomposite material.

A porous particulate nanocomposite material is described. The porous particulate nanocomposite material includes: an orthorhombic $CaB_2O_4$ crystalline phase; an orthorhombic $Co_3(BO_3)_2$ crystalline phase; an orthorhombic $PbO_2$ crystalline phase; and, a cubic $Co_3O_4$ crystalline phase.

In some embodiments, the porous particulate nanocomposite material has a volume average crystallite size, as determined by X-ray diffraction, ranging from about 65 to about 70 nm, including specific ranges such as from about 66 to about 70 nm, from about 67 to about 70 nm, from about 68 to about 70 nm or from about 68 to about 69 nm. In a preferred embodiment, the porous particulate nanocomposite material has a volume average crystallite size, as determined by X-ray diffraction, of 68.74 nm.

In some embodiments, the nanocomposite material may possess various morphological forms. It is envisaged, for example, that particles of the nanocomposite that are fibrous, acicular, spherical, ellipsoidal, cylindrical, bead-like, cubic or platelet-like may be present alone or in combination. Moreover, it is envisaged that agglomerates of particles having the same or different morphologies may be present in the nanocomposite.

In present disclosure, the porous particulate nanocomposite material has a multimodal particle size distribution, as determined by Scanning Electron Microscopy. In preferred embodiment, the porous particulate nanocomposite material is in the form of particles having a matrix phase with a smooth surface and in which sharp-edged plates are embedded and protrude.

In preferred embodiment, the nanocomposite material comprises: plate-like particles having a first median volume particle size; granular particles having a second median volume particle size which is less than said first median volume particle size; and, agglomerates thereof. The plate-like particles may comprise $CaB_2O_4$ and $Co_3(BO_3)_2$.

Figure 3:
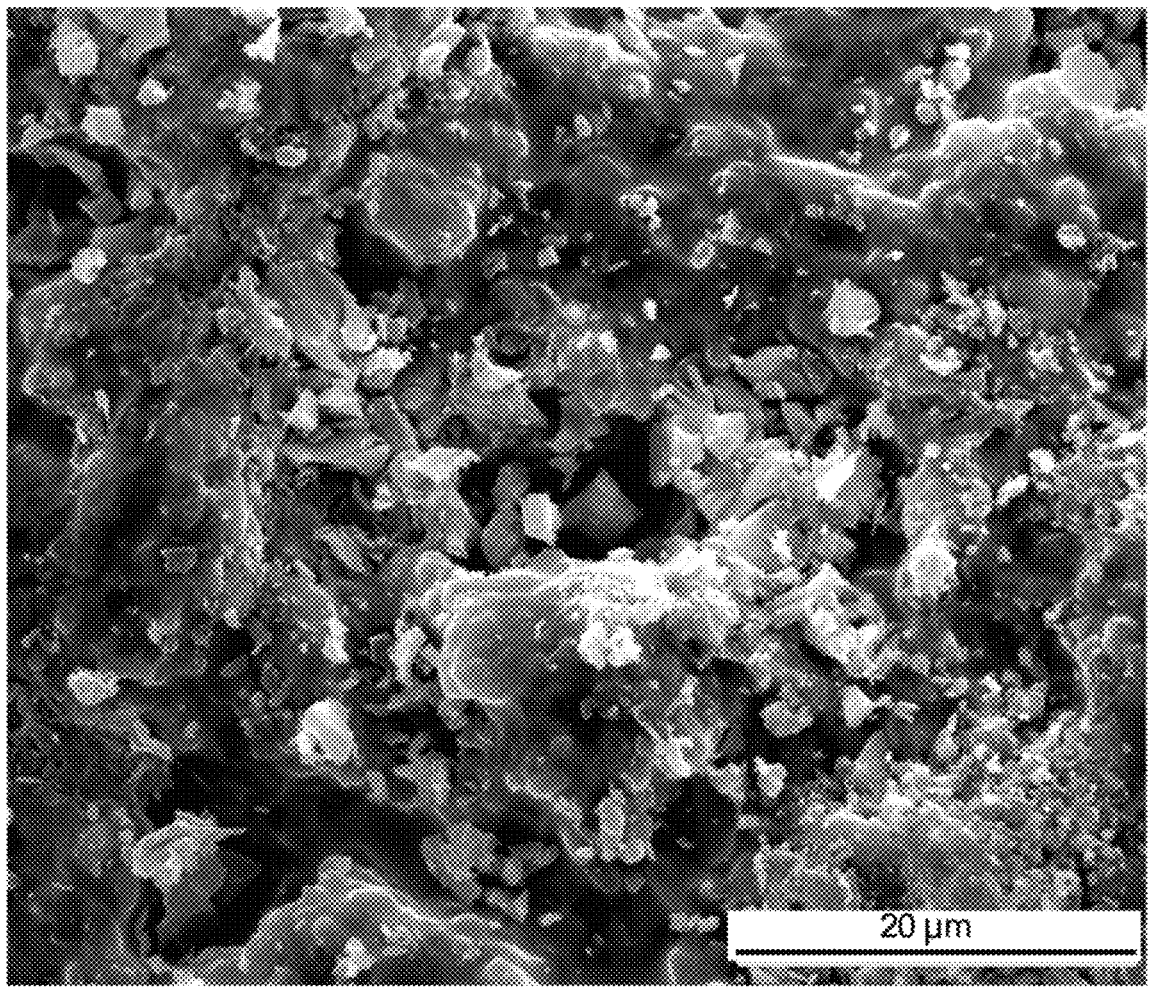
FIG. 3 shows a scanning electron microscope (SEM) image of the $CaB_2O_4/Co_3(BO_3)_2/PbO_2/Co_3O_4$ nanocomposite material, according to certain embodiments.

The nanoparticulate material—as exemplified in the Scanning Electron Micrograph of FIG. 3 appended hereto—thus possesses a heterogeneous surface and, further, some heterogeneity in the observed pores. For instance, both large crevasse-like pore and small pores possessing some roundness may be present in the structure, with neither having a regular or repeating morphology in that pores of both high and low roundness are interspersed. The hierarchical pore structure is considered to provide utility of the membrane in processes such as filtration or adsorption which call for interactions at several scales.

In some embodiments, the atomic concentration of boron in the nanocomposite material ranges from about 1 to about 10 atom %, based on the total number of atoms in the nanocomposite material, for example from about 2 to about 10 atom %, from about 2 to about 8 atom %, from about 3 to about 8 atom %, from about 3 to about 6 atom % or from about 4 to about 6 atom %. In a preferred embodiment, the atomic concentration of boron in the nanocomposite material is 5.10% of the total number of atoms.

In some embodiments, the atomic concentration of lead in the nanocomposite material ranges from about 1 to about 10 atom %, based on the total number of atoms in the nanocomposite material, for example from about 2 to about 10 atom %, from about 2 to about 8 atom %, from about 3 to about 8 atom %, from about 3 to about 6 atom % or from about 4 to about 6 atom %. In a preferred embodiment, the atomic concentration of lead in the nanocomposite material is 4.90% of the total number of atoms.

In some embodiments, the atomic concentration of calcium in the nanocomposite material ranges from about 5 to about 20 atom %, based on the total number of atoms in the nanocomposite material, for example from 10 to about 20 atom %, from about 10 to about 18 atom %, from about 10 to about 16 atom %, from about 10 to about 16 atom %, or from about 10 to about 14 atom %. In a preferred embodiment, the atomic concentration of calcium in the nanocomposite material is 12.30% of the total number of atoms.

In some embodiments, the atomic concentration of oxygen in the nanocomposite material ranges from about 60 to about 80 atom %, based on the total number of atoms in the nanocomposite material, for example from about 60 to about 75 atom % or from about 65 to about 70 atom %. In a preferred embodiment, the atomic concentration of oxygen in the nanocomposite material is 69.20% of the total number of atoms.

In some embodiments, the atomic concentration of cobalt in the nanocomposite material ranges from about 5 to about 20 atom %, based on the total number of atoms in the nanocomposite material, for example from about 5 to about 15 atom % or from about 5 to about 10 atom %. In a preferred embodiment, the atomic concentration of cobalt in the nanocomposite material is 8.50% of the total number of atoms.

FIG. 1A illustrates a schematic flow chart of a method 50 of preparing the porous particulate nanocomposite material. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 comprises forming an aqueous mixture by adding an aqueous solution of a chelating agent into an aqueous solution of a calcium salt, a cobalt salt, lead salt and boric acid. In present disclosure, the aqueous solution of the chelating agent may desirably be added in a dropwise manner into the aqueous solution of the calcium salt, the cobalt salt, the lead salt and boric acid.

Exemplary calcium salts having utility in the present method include, but are not limited to, calcium carbonate ($CaCO_3$), calcium sulfate ($CaSO_4$), calcium chloride ($CaCl_2$)), calcium acetate ($Ca(C_2H_3O_2)_2$), calcium hydroxide ($Ca(OH)_2$), calcium phosphate ($Ca_3(PO_4)_2$), calcium citrate ($Ca_3(C_6H_5O_7)_2$), calcium lactate ($Ca(C_6H_{11}O_7)_2$), calcium formate ($Ca(HCO_2)_2$), calcium oxide (CaO), calcium carbide ($CaC_2$), calcium fluoride ($CaF_2$), calcium pyrophosphate ($Ca_2P_2O_7$), calcium silicate ($CaSiO_3$), calcium metasilicate ($CaSiO_4$), calcium borate ($CaB_4O_7$), calcium chromate ($CaCrO_4$), calcium permanganate ($Ca(MnO_4)_2$), calcium iodide ($CaI_2$), calcium bromide ($CaBr_2$), calcium thiocyanate ($Ca(SCN)_2$), calcium carbonate hydroxide ($CaCO_3Ca(OH)_2$), calcium nitrate tetrahydrate ($Ca(NO_3)_2 \cdot 4H_2O$), calcium glucoheptonate ($Ca(C_6H_{11}O_7)_2$), calcium stearate ($Ca(C_{18}H_{35}O_2)_2$), calcium sulfate dihydrate ($CaSO_4 \cdot 2H_2O$), calcium tartrate ($Ca(C_4H_4O_6)$), calcium malate ($Ca(C_4H_4O_5)_2$), and calcium oxalate ($CaC_2O_4$). In some embodiments, the calcium salt may be selected from the group consisting of calcium sulfate ($CaSO_4$), calcium nitrate ($Ca(NO_3)_2$), calcium chloride ($CaCl_2$) and calcium acetate ($Ca(CH_3COO)_2$). In a preferred embodiment, the calcium salt is calcium nitrate ($Ca(NO_3)_2$).

Exemplary cobalt salts having utility in the present method include, but are not limited to, cobalt sulfate ($CoSO_4$), cobalt chloride ($CoCl_2$), cobalt acetate ($Co(CH_3COO)_2$), cobalt carbonate ($CoCO_3$), cobalt hydroxide ($Co(OH)_2$), cobalt oxide (CoO), cobalt bromide ($CoBr_2$), cobalt iodide (Cob), cobalt formate ($Co(HCO_2)_2$), cobalt phosphate ($Co_3(PO_4)_2$), cobalt lactate ($Co(C_6HuO_7)_2$), cobalt citrate ($CO_3(C_6H_5O_7)_2$), cobalt tartrate ($Co(C_4H_4O_6)$), cobalt malate ($Co(C_4H_4O_5)_2$), cobalt stearate ($Co(C_{18}H_{35}O_2)_2$), cobalt oxalate ($CoC_2O_4$), cobalt acetate tetrahydrate ($Co(CH_3COO)_2 \cdot 4H_2O$), cobalt formate tetrahydrate ($Co(HCO_2)_2 \cdot 4H_2O$), cobalt aluminate ($CoAl_2O_4$), cobalt silicate ($CoSiO_3$), cobalt bromate ($Co(BrO_3)_2$), cobalt chloride hexahydrate ($CoCl_2 \cdot 6H_2O$), cobalt nitrate hexahydrate ($Co(NO_3)_2 \cdot 6H_2O$), cobalt dichloride ($CoCl_2 \cdot 2H_2O$), cobalt tetrafluoroborate ($Co(BF_4)_2$), cobalt acetate monohydrate ($Co(CH_3COO)_2 \cdot H_2O$), cobalt hydrogen phosphate ($CoHPO_4$), cobalt sulfide (CoS), and cobalt chromate ($CoCrO_4$). In some embodiments, the cobalt salt is selected from the group consisting of cobalt sulfate ($CoSO_4$), cobalt nitrate ($Co(NO_3)_2$), cobalt chloride ($CoCl_2$) and cobalt acetate ($Co(CH_3COO)_2$). In a preferred embodiment, the cobalt salt is cobalt nitrate ($Co(NO_3)_2$).

Exemplary lead salts having utility in the present method include, but are not limited to, lead sulfate ($PbSO_4$), lead chloride ($PbCl_2$), lead acetate ($Pb(CH_3COO)_2$), lead carbonate ($PbCO_3$), lead oxide (PbO), lead bromide ($PbBr_2$), lead iodide (PbI), lead formate ($Pb(HCO_2)_2$), lead phosphate ($Pb_3(PO_4)_2$), lead lactate ($Pb(C_6H_{11}O_7)_2$), lead citrate ($Pb_3(C_6H_5O_7)_2$), lead tartrate ($Pb(C_4H_4O_6)$), lead malate ($Pb(C_4H_4O_5)_2$), lead stearate ($Pb(C_{18}H_{35}O_2)_2$), lead oxalate ($PbC_2O_4$), lead acetate tetrahydrate ($Pb(CH_3COO)_2 \cdot 4H_2O$), lead chloride hexahydrate ($PbCl_2 \cdot 6H_2O$), lead formate tetrahydrate ($Pb(HCO_2)_2 \cdot 4H_2O$), lead aluminate ($PbAl_2O_4$), lead silicate ($PbSiO_3$), lead bromate ($Pb(BrO_3)_2$), lead iodate ($Pb(IO_3)_2$), lead hydroxide ($Pb(OH)_2$), lead sulfide (PbS), lead chromate ($PbCrO_4$), lead nitrate hexahydrate ($Pb(NO_3)_2 \cdot 6H_2O$), lead bromide hydrate ($PbBr_2 \cdot H_2O$), lead nitrate tetrahydrate ($Pb(NO_3)_2 \cdot 4H_2O$), and lead ferrite ($PbFe_3O_4$). In some embodiments, the lead salt is selected from the group consisting of lead sulfate ($PbSO_4$), lead nitrate ($Pb(NO_3)_2$), lead chloride ($PbCl_2$) and lead acetate ($Pb(CH_3COO)_2$). In a preferred embodiment, the lead salt is lead nitrate ($Pb(NO_3)_2$).

As used herein, the term 'chelating agent' refers to the chemical compound that can form multiple bonds with a single metal ion, resulting in a stable, ring-like structure known as a chelate complex. The agent has multiple donor atoms (e.g., oxygen, nitrogen, sulfur) that can coordinate with the metal ion, effectively clawing the metal and preventing it from engaging in other chemical reactions. This multidentate binding increases the stability of the metal complex compared to simple, monodentate ligands.

The chelating agent of the present disclosure is typically chosen from aminopolycarboyxlic acids, aminophosphonic acids, hydroxyalkyl carboxylic acids and mixtures thereof. Exemplary aminopolycarboyxlic acids include: ethylenediamine disuccinic acid; nitrilotriacetic acid; ethylenediaminetetraacetic acid (EDTA); ethylenediaminetetapropionic acid; diethylene triamine pentaacetic acid (DTPA) and triethylenetetraaminehexacetic acid.

In an important embodiment, the chelating agent comprises at least one hydroxyalkyl carboxylic acid selected from the group consisting of citric acid, tartaric acid, malic acid, mandelic acid and 12-hydroxystearic acid. In a preferred embodiment, the chelating agent comprises or consists of tartaric acid.

The total amount of chelating agent added, optionally in the dropwise manner, at method step 52 of FIG. 1 is at least equimolar and, more typically, in molar excess to the total number of moles of calcium, cobalt and lead in the aqueous solution. In certain embodiments, the ratio of the total number of moles of chelating agent to the total number of moles of calcium, cobalt and lead is from about 1:1 to about 2:1, for example from about 1.2:1 to about 1.6:1 or from about 1.3:1 to about 1.5:1.

At step 54, the method 50 includes adding a polyol into the aqueous mixture to form a gel. In present disclosure, the polyol may desirably be added in a dropwise manner into the aqueous mixture.

Without intention to be bound by theory, the polyol may serve to control the formation of agglomerated particles during the synthesis of the metal oxide nanoparticles through the aqueous sol-gel method. Typically herein, the polyol has: a number average molecular weight of from about 200 to about 5000 g/mol., preferably from about 200 to about 1000 g/mol. and more preferably from 200 to 500 g/mol.; and, a hydroxyl number of from about 25 to about 500 mg, more preferably 200 to 500 mg, and yet more preferably 200 to 300 mg KOH/g.

The polyols having utility in the present disclosure may be monomeric compounds, for instance monomeric aliphatic, cycloaliphatic or aromatic compounds having from 2 to 6 hydroxyl groups per molecule. Exemplary monomeric diols, which may be used alone or in combination include: ethylene glycol; propylene glycol; 1,3-propane diol; 1,2-butane diol; 2-methyl propanediol; 1,3-butane diol; 1,4-butane diol; 2,3-butanediol; neopentyl glycol; hexanediol; decanediol; hexamethylene glycol; cyclohexane dimethanol; polyoxalkylene glycols, such as diethylene glycol, dipropylene glycol, triethylene glycol, tetraethylene glycol, tripropylene glycol and tetrapropylene glycol; and, aromatic diols such as bisphenol A, bisphenol F, hydrogenated bisphenol A and hydrogenated bisphenol F. Exemplary triols, which may be used alone or in combination include: 1,2,3-propanetriol; 1,2,4-butanetriol; 2-ethyl-2-hydroxymethyl-1,3-propanediol (trimethylolpropane); 3-methyl-1,3,5-pentanetriol; 1,2,3-hexanetriol; 1,2,6-hexanetriol; 2,5-dimethyl-1,2,6-hexanetriol; 1,2,3-heptanetriol; 1,2,3-octanetriol; and, 2-hydroxymethyl-1,3-propanediol. Exemplary tetrols and pentols include: 2,2-bis(hydroxymethyl)propane-1,3-diol (pentaerythritol); pentose; pentopyranose; 6-deoxyhexopyranose; 2,5-anhydrohexitol; 1,5-anhydrohexitol; 6-deoxyhexose; 1-deoxyhexitol; and, pentitol. An exemplary polyol having six hydroxyl groups is D-glucitol (sorbitol).

The present disclosure also provides for the use of polymeric polyols. In an embodiment, the polyol is selected from the group of: polyester polyols; polyether polyols; poly(ether-ester) polyols; poly(alkylene carbonate) polyols; and, mixtures thereof.

Polycarbonate diols having utility herein may be obtained by reacting carbonic acid derivatives with diols. Exemplary carbonic acid derivatives are diaryl carbonates including but not limited to diphenyl carbonate, di($C_1$-$C_6$)alkyl carbonates and phosgene. Exemplary diols include but are not limited to: ethylene glycol; 1,2-propanediol; 1,3-propanediol; 1,3-butanediol; 1,4-butanediol; 1,5-pentanediol; 1,6-hexanediol; cyclohexane dimethanol; diethylene glycol; dipropylene glycol; neopentylglycol; and, mixtures thereof.

Polyester diols having utility herein may be obtained by reacting diols with either aliphatic, aromatic or cycloaliphatic dicarboxylic acids or, in some circumstances, the corresponding anhydrides thereof: the reaction may optionally take place in the presence of an esterification catalyst. Examples of suitable dicarboxylic acids include but are not limited to: adipic acid; glutaric acid; pimelic acid; suberic acid; nonanedicarboxylic acid; decanedicarboxylic acid; succinic acid; maleic acid; sebacic acid; azelaic acid; terephthalic acid; isophthalic acid; o-phthalic acid; tetrahydrophthalic acid; hexahydrophthalic acid; trimellitic acid; and, 1,4-cyclohexanedicarboxylic acid. Examples of suitable anhydrides include succinic, o-phthalic and trimellitic anhydride. It is noted that various commercially available dimeric fatty acids in saturated (hydrogenated) or unsaturated form may also be used as the dicarboxylic acid. And examples of suitable diols for the preparation of the polyester diols are: ethanediol; di-, tri- or tetraethylene glycol; 1,2-propanediol; di-, tri-, tetrapropylene glycol; 1,3-propanediol; 1,4-butanediol; 1,3-butanediol; 2,3-butanediol; 1,6-hexanediol; 1,5-pentanediol; 2,2-dimethyl-1,3-propanediol (neopentylglycol); 1,4-dihydroxycyclohexane; 1,4-dimethylcyclohexane; 1,8-octanediol; 1,10-decanediol; 1,12-decanediol; 2,2,4- and/or 2,4,4-trimethyl-1,3-pentanediol; and, mixtures thereof.

Other useful polyester diols are those obtainable from diol initiated polymerization of hydroxycarboxylic acids containing from 2 to 12 carbon atoms or a lactone thereof. The hydroxycarboxylic acids may be saturated or unsaturated, linear or branched, of which example include: glycolic acid; lactic acid; 5-hydroxy valeric acid; 6-hydroxy caproic acid; ricinoleic acid; 12-hydroxy stearic acid; 12-hydroxydodecanoic acid; 5-hydroxydodecanoic acid; 5-hydroxydecanoic acid; and. 4-hydroxydecanoic acid. Examples of suitable lactones are β-propiolactone, δ-valerolactone, ($C_1$-$C_6$)alkyl valerolactone, ε-caprolactone and ($C_1$-$C_6$)alkyl-ε-caprolactone.

In an embodiment, the polyol is a polyether polyol. Exemplary polyether polyols may be obtained from the polymerization of a cyclic oxide—such as ethylene oxide, propylene oxide or butylene oxide—or by the addition of one or more such oxides to polyfunctional initiators having at least two active hydrogen atoms, such as water, polyhydric alcohols, polythiols, polyamines and alkanolamines.

In a preferred embodiment, the polyol comprises a polyoxy($C_2$-$C_3$)alkylene polyol having: a number average molecular weight of from about 200 to about 5000 g/mol.; and, an hydroxyl number of from about 25 to about 500 mg KOH/g. For example, the polyol may comprise a polyoxy($C_2$-$C_3$)alkylene polyol having: a number average molecular weight of from about 200 to about 1000 g/mol. or from about 200 to about 500 g/mol; and, an hydroxyl number of from about 200 to about 500 mg KOH/g. or from about 200 to 300 mg KOH/g. Polyethylene glycol (PEG) 400 may be mentioned as an exemplary polyoxy($C_2$-$C_3$)alkylene polyol.

Referring back to FIG. 1, at step 54 of the method, the total amount of polyol added, optionally in a dropwise manner, is conventionally determined by the observed gel formation. However, in certain embodiments, the molar ratio of the total amount of polyol added to the total amount of chelating agent may be from about 1:10 to about 1:2, for example from about 1:10 to about 1:4 or from about 1:10 to about 1:6.

At step 56, the method 50 includes heating the gel under stirring at a temperature of from about 200 to about 400° C. for a sufficient duration to form a dry powder. In some embodiments, the gel is heated under stirring at a temperature ranging from about 200 to about 350° C., for example from about 200 to about 300° C., from about 210 to about 290° C., from about 220 to about 280° C., from about 230 to about 270° C. or from about 240 to about 260° C. In a preferred embodiment, the gel is heated at 250° C. In some embodiments, the heating can be performed by using heating appliances such as ovens, microwaves, autoclaves, hot plates, heating mantles and tapes, oil baths, salt baths, sand baths, air baths, hot-tube furnaces, and hot-air guns.

At step 58, the method 50 includes calcining the dry powder at a temperature of from about 500 to about 800° C., preferably from about 550 to about 700° C., and more preferably from about 600 to about 700° C. to form the particulate nanocomposite material. The calcination is carried out by heating it to a high temperature, under a restricted supply of ambient oxygen. This is performed to remove impurities or volatile substances and to incur thermal decomposition. Typically, the calcination is carried out in a furnace equipped with a temperature control system, which may provide a heating rate of up to about 50° C./min, for example up to about 40° C./min, up to about 30° C./min, up to about 20° C./min, up to about 10° C./min or up to about 5° C./min. In preferred embodiments, the dry powder is calcined for a duration of from about 2 to about 4 hours, such as from about 2.5 to about 3.5 hours or about 3 hours to form the particulate nanocomposite material.

It is not precluded in the present method, that the particles directly obtained from the calcination step may be subjected to at least one of comminution, homogenization or classification in order to moderate the particle size distribution thereof.

In some embodiments, a heterogeneous catalyst is provided which includes the porous particulate nanocomposite. A heterogeneous catalyst is a catalyst that exists in a different phase from the reactants in a chemical reaction. Herein, where the catalyst will comprise a particulate solid, the reactants may be gases and/or liquids. The catalytic process involves the reactants adsorbing onto the surface of the solid catalyst, where the reaction takes place, and then desorbing the products after the reaction. The catalyst itself remains chemically unchanged during the reaction. Where there are no substantial deposits in the pores of the nanocomposite and the catalyst maintains its structural integrity during the catalyzed reaction, a heterogenous catalyst comprising the particulate porous nanocomposite may be reused.

The particulate nanocomposite material of the present disclosure presents several advantages, in particular an enhanced surface area, which may boost reactivity and efficiency in applications such as catalysis and adsorption. The pore network of the nanocomposite can facilitate diffusion of molecules, making it highly effective in processes such as catalysis. The adsorption capacity of the porous material allows for selective trapping of molecules, making them ideal for applications like water treatment, and pollutant removal.

A method of immobilizing inorganic contaminants disposed in an aqueous medium is also described. The method includes contacting the aqueous medium with the porous particulate nanocomposite material as described hereinabove. This method relies on the absorption of the inorganic contaminants—of which metal ions dissolved in waste water may be mentioned as important examples—onto the porous nanocomposite material.

A method of degrading organic pollutants disposed in an aqueous medium is still further described. The method includes contacting the aqueous medium under actinic irradiation with a porous particulate nanocomposite material.

Exemplary organic pollutants include, but are not limited to: dyes; phenols; polycyclic aromatic hydrocarbons (PAH); organic herbicides; organic pesticides, including organic algicides, fungicides, bactericides, virucides, insecticides and miticides; and, persistent organic pollutants. For completeness, a persistent organic pollutant is a toxic organic chemical that adversely affects human and environmental health, can be transported by wind and water, and can persist for years, decades, or centuries owing to resistance to environmental degradation by natural chemical, biological, or photolytic processes. Persistent organic pollutants are regulated by the United Nations Environment Programme (UNEP), 2001 Stockholm Convention on Persistent Organic Pollutants.

The methods of immobilizing inorganic contaminants and of photocatalytic degradation of organic pollutants both require an aqueous medium to be brought into contact with the nanocomposite material for a sufficient contact time to permit absorption of the species concerned. The aqueous medium may be provided as a static volume in which the nanocomposite material is dispersed. In an alternative embodiment, the aqueous medium may be provided as fixed volume in which the nanoparticulate is dispersed but which is subjected to agitation: the nanoparticulate material may be suspended in the volume or may be constrained within a bed or membrane or by a support. In a further non-limiting alternative, the aqueous medium may be provided as a flow which contacts the nanoparticulate material. In this embodiment, the nanoparticulate material may need to constrained within a bed or membrane which the aqueous medium contacts as either a perpendicular or tangential (cross-) flow stream.

EXAMPLES

The following examples demonstrate a $CaB_2O_4/Co_3(BO_3)_2/PbO_2/Co_3O_4$ nanocomposite material. The examples are provided solely for illustration and are not to be construed as limitations of the present disclosure, as many variations thereof are possible without departing from the spirit and scope of the present disclosure.

Figure 1B:
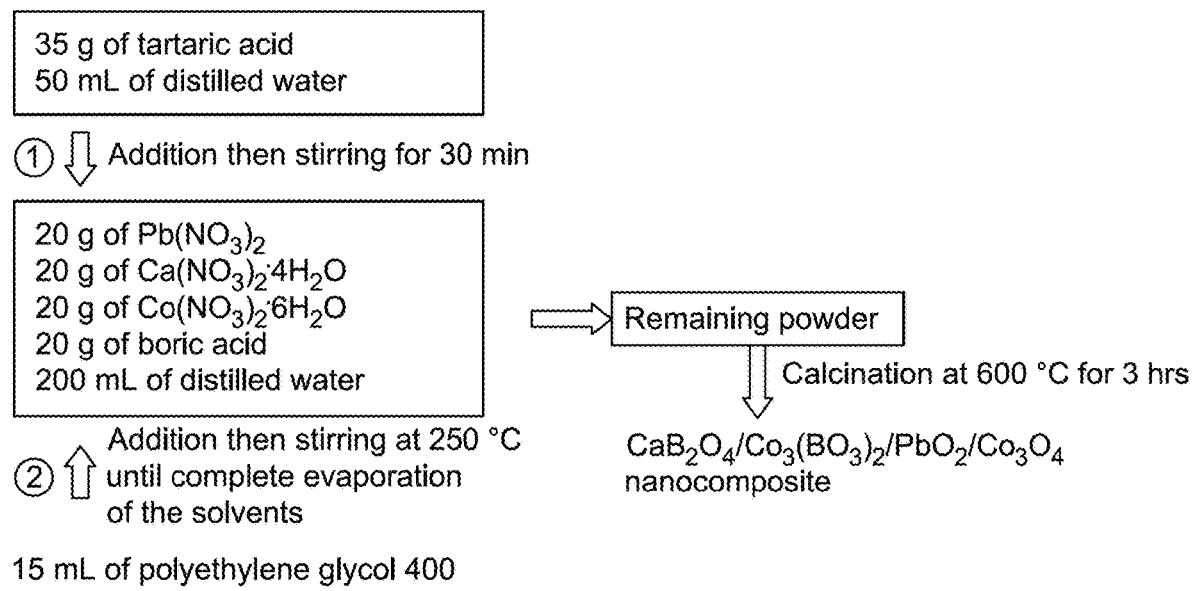
FIG. 1B shows experimental steps for the production of $CaB_2O_4/Co_3(BO_3)_2/PbO_2/Co_3O_4$ nanocomposite material, according to certain embodiments.

Example 1: Synthesis of $CaB_2O_4/Co_3(BO_3)_2/PbO_2/Co_3O_4$ Nanocomposite Material Using Pechini Sol-Gel Method The synthesis of $CaB_2O_4/Co_3(BO_3)_2/PbO_2/Co_3O_4$ nanocomposite was conducted via the Pechini sol-gel method, as shown in FIG. 1B. Initially, 35 g of tartaric acid was dissolved in 50 mL of distilled water. In a separate step, 20 g each of lead nitrate ($Pb(NO_3)_2$), calcium nitrate tetrahydrate ($Ca(NO_3)_2 \cdot 4H_2O$), cobalt nitrate hexahydrate ($Co(NO_3)_2 \cdot 6H_2O$), and boric acid were dissolved in 200 mL of distilled water. The tartaric acid solution prepared in the first step was then added to this mixed metal solution with continuous stirring for 30 min. Subsequently, 15 mL of polyethylene glycol 400 was introduced to the mixture with further stirring while the temperature was maintained at 250° C. until the solvents were completely evaporated, resulting in a dry precursor. The resulting powder was then subjected to calcination at 600° C. for 3 hrs to achieve the formation of the $CaB_2O_4/Co_3(BO_3)_2/PbO_2/Co_3O_4$ nanocomposite.

To evaluate the structural, elemental, and morphological properties of the synthesized nanocomposite, it was characterized using X-ray diffraction (XRD), energy-dispersive X-ray spectroscopy (EDX) and scanning electron microscopy (SEM).

Results

Figure 2:
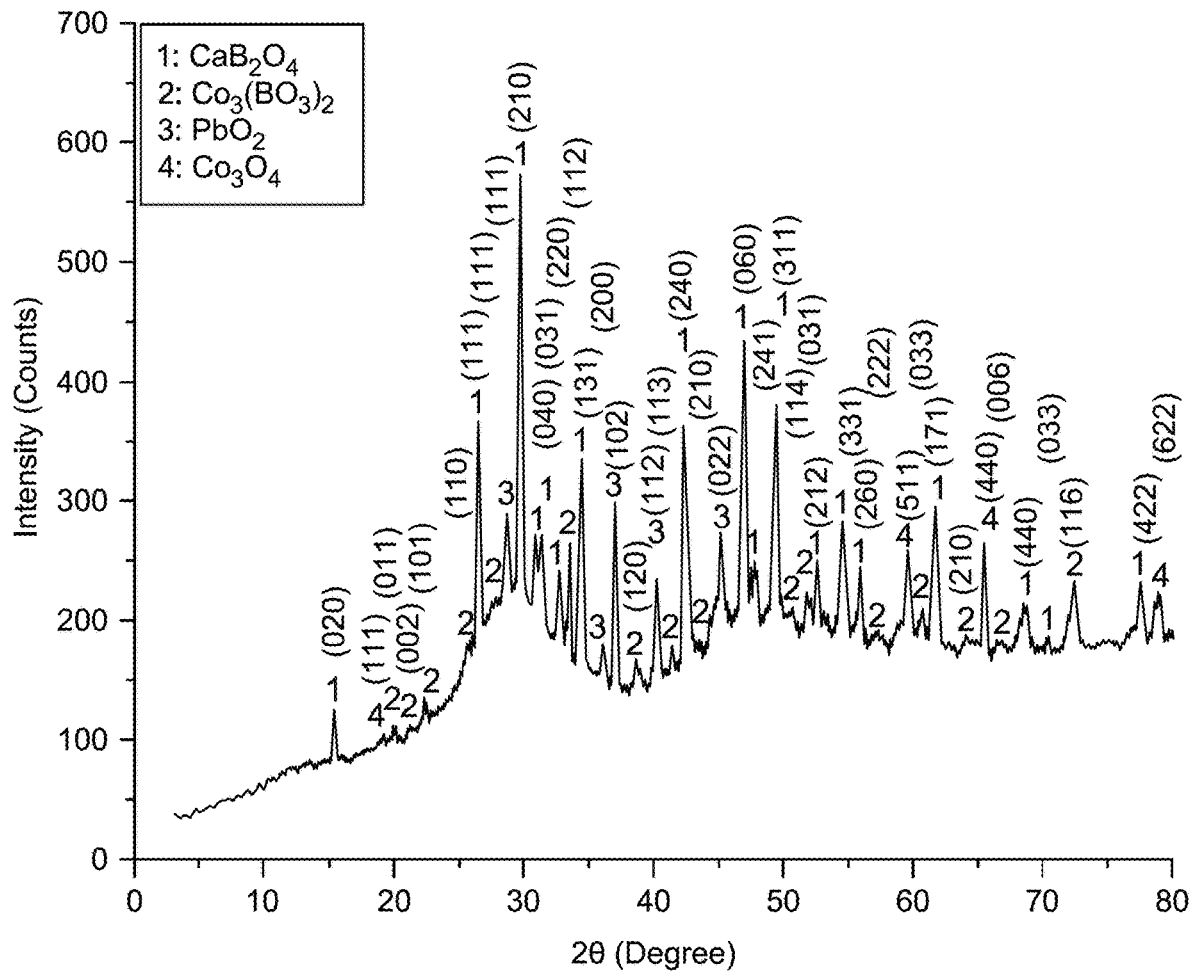
FIG. 2 illustrates an X-ray diffraction (XRD) pattern of the $CaB_2O_4/Co_3(BO_3)_2/PbO_2/Co_3O_4$ nanocomposite material, according to certain embodiments.

The X-ray diffraction (XRD) pattern in FIG. 2 represents the nanocomposite as prepared in Example 1 and which includes crystalline phases of calcium borate ($CaB_2O_4$), cobalt borate ($Co_3(BO_3)_2$), lead oxide ($PbO_2$), and cobalt oxide ($Co_3O_4$). The $CaB_2O_4$ phase corresponds to International Centre for Diffraction Data (ICDD) entry JCPDS No. 00-022-0522, the disclosure of which is incorporated herein in its entirety: the $CaB_2O_4$ phase crystallizes in an orthorhombic crystal system, with its diffraction peaks at 2θ angles of 15.32, 26.43, 29.69, 30.84, 31.26, 32.74, 34.42, 42.49, 46.89, 47.64, 49.11, 52.57, 54.56, 55.81, 61.59, 68.41, 70.29, and 77.54, which correspond to the Miller indices (020), (111), (210), (040), (031), (220), (131), (240), (060), (241), (311), (212), (331), (260), (171), (440), (033), and (422), respectively. The $Co_3(BO_3)_2$ phase—referenced by International Centre for Diffraction Data (ICDD) entry JCPDS No. 01-073-1540, the disclosure of which is incorporated herein in its entirety—also crystallizes in an orthorhombic system and displays peaks at 2θ values of 19.94, 21.09, 22.34, 25.69, 27.69, 33.36, 38.72, 41.33, 43.34, 50.67, 51.84, 57.07, 60.54, 64.00, 66.74, and 72.30, with Miller indices (011), (002), (101), (110), (111), (112), (120), (113), (210), (114), (031), (222), (033), (310), (006), and (116), respectively. $PbO_2$ appears in accordance with International Centre for Diffraction Data (ICDD) entry JCPDS No. 01-072-2102, the disclosure of which is incorporated herein in its entirety: the $PbO_2$ is in an orthorhombic crystal system and exhibits 2θ peaks at 28.64, 36.09, 37.03, 40.18, and 45.11 with miller indices (111), (200), (102), (112), and (022), respectively. Lastly, $Co_3O_4$ is referenced by International Centre for Diffraction Data (ICDD) entry JCPDS No. 01-074-1656, the disclosure of which is incorporated herein in its entirety: the $Co_3O_4$ has a cubic crystal system, presenting diffraction peaks at 2θ values of 19.09, 59.49, 65.37, and 78.79 with miller indices (111), (511), (440), and (622), respectively. The average crystallite size of the nanocomposite is approximately 68.74 nm.

FIG. 3 presents the SEM image of the nanocomposite, revealing a highly heterogeneous morphology. The image demonstrates a matrix phase in which certain observable structures are embedded. A fraction of the observable embedded structures comprise sharp-edged plates, which are considered to correspond to borate and oxide formations, and irregularly shaped particle clusters which contribute to the porosity of the material. Smaller granules are also observed and are interspersed across the material's surface, indicating the presence of fine crystallites embedded within larger particle aggregates.

Figure 4:
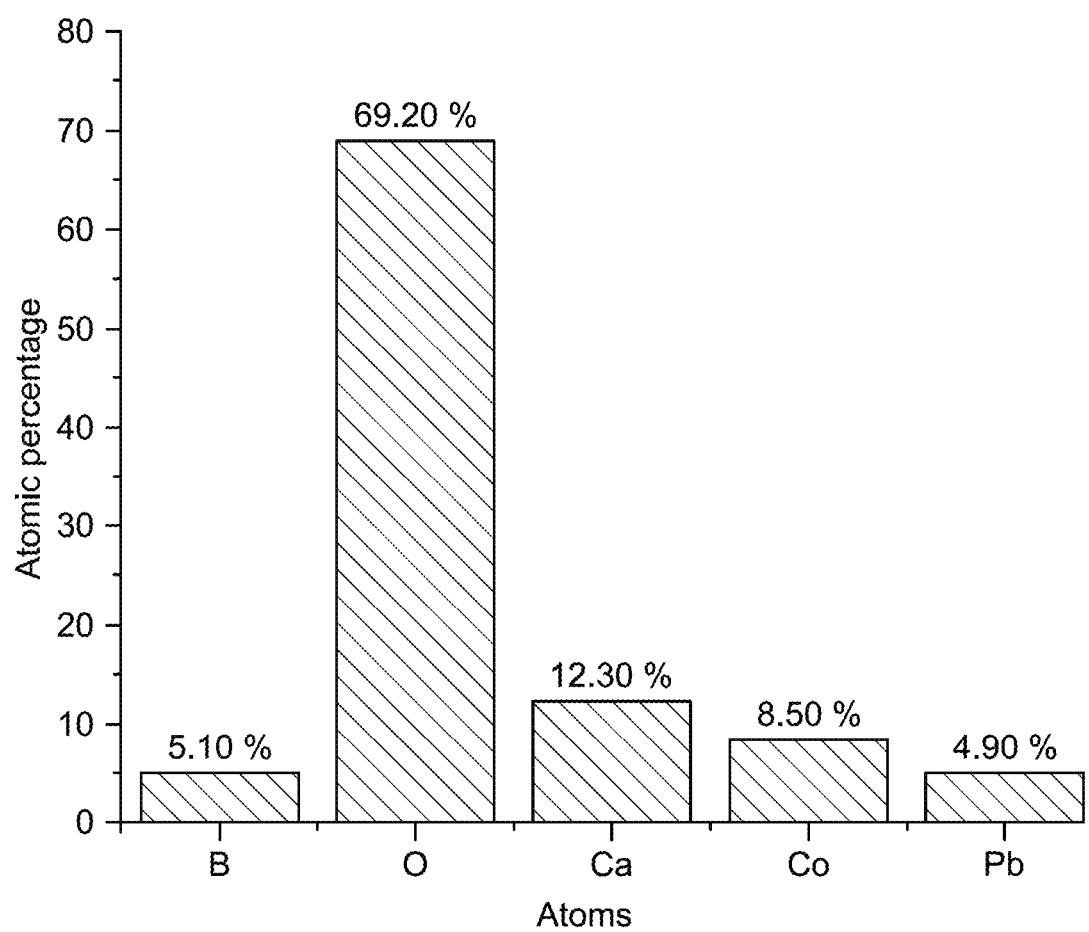
FIG. 4 is a graph showing the atomic percentage distribution of elements in the $CaB_2O_4/Co_3(BO_3)_2/PbO_2/Co_3O_4$ nanocomposite material, as determined by energy-dispersive X-ray spectroscopy (EDX) analysis, according to certain embodiments.

FIG. 4 illustrates the atomic percentage distribution of elements within the $CaB_2O_4/Co_3(BO_3)_2/PbO_2/Co_3O_4$ nanocomposite, as determined using energy-dispersive X-ray spectroscopy (EDX). FIG. 4 shows a predominant presence of oxygen at 69.20%, reflecting the high oxide content characteristic of the composite. Calcium accounts for 12.30% of the atomic composition, likely attributed to the $CaB_2O_4$ component, while cobalt represents 8.50%, contributing to both $CO_3(BO_3)_2$ and $Co_3O_4$ phases. Boron, comprising 5.10%, indicates the inclusion of borate structures, and lead, at 4.90%, corresponds to the $PbO_2$ phase. This elemental analysis confirms the successful integration of the composite's targeted constituents, essential for achieving the desired structural and functional properties.

The composite's thermal stability and multi-phase composition position it as an advanced material for adsorption, catalysis, and other high-performance applications across environmental and industrial sectors.

To summarize, the present disclosure provides a $CaB_2O_4/Co_3(BO_3)_2/PbO_2/Co_3O_4$ nanocomposite material synthesized via the Pechini sol-gel method, offering significant advantages over existing materials. The synthesis method utilizes accessible reagents and operates at relatively low temperatures, resulting in a stable composite. XRD analysis confirms the successful formation of distinct crystalline phases of calcium borate, cobalt borate, lead oxide, and cobalt oxide, with an average crystallite size of approximately 68.74 nm. SEM images reveal a heterogeneous morphology featuring agglomerated particles and well-defined crystallites embedded within larger aggregates, indicating structural robustness and complexity. Energy-dispersive X-ray spectroscopy (EDX) analysis further validates the elemental composition, showing a predominant presence of oxygen and balanced distributions of calcium, cobalt, boron, and lead, which aligns with the target nanocomposite structure. This unique composite, combined with the method's simplicity, provides an innovative solution to the challenges faced by conventional nanocomposite synthesis techniques.

Numerous modifications and variations of the present disclosure are possible in light of the above teachings. It is, therefore, to be understood that within the scope of the appended claims, the invention may be practiced otherwise than as specifically described herein.

The invention claimed is:

1. A porous particulate nanocomposite material comprising, as determined by X-ray diffraction:
   an orthorhombic $CaB_2O_4$ crystalline phase;
   an orthorhombic $Co_3(BO_3)_2$ crystalline phase;
   an orthorhombic $PbO_2$ crystalline phase; and,
   a cubic $Co_3O_4$ crystalline phase,
   wherein the porous particulate nanocomposite material is in the form of particles having a matrix phase with a smooth surface and in which sharp-edged plates are embedded and protrude, and
   wherein an atomic concentration of boron in the nanocomposite material is from about 1 to about 10 atom %, an atomic concentration of lead is from about 1 to about 10 atom %, an atomic concentration of calcium is from about 5 to about 20 atom %, and an atomic concentration of cobalt is from about 5 to about 20 atom %, based on the total number of atoms in the nanocomposite material.

2. The porous particulate nanocomposite material according to claim 1 having a median crystallite size, as determined by X-ray diffraction, of from about 65 to about 70 nm.

3. The porous particulate nanocomposite material according to claim 1 having a median crystallite size crystallite size, as determined by X-ray diffraction, of from about 68 to about 70 nm.

4. The porous particulate nanocomposite material according to claim 1 having a multimodal particle size distribution.

5. The porous particulate nanocomposite material according to claim 1 having a multimodal particle size distribution and comprising, as determined by Scanning Electron Microscopy:
   plate-like particles having a first median volume particle size;
   granular particles having a second median volume particle size which is less than said first median volume particle size; and,
   agglomerates thereof.

6. The porous particulate nanocomposite material according to claim 5, wherein the plate-like particles comprise at least one of $CaB_2O_4$ and $Co_3(BO_3)_2$.

7. A method for preparing the porous particulate nanocomposite according to claim 1, the method comprising:
forming an aqueous mixture by adding an aqueous solution of a chelating agent into an aqueous solution of a calcium salt, a cobalt salt, lead salt and boric acid;
adding a polyol into the aqueous mixture to form a gel;
heating the gel under stirring at a temperature of from about 200 to about 400° C. for a sufficient duration to form a dry powder; and,
calcining the dry powder at a temperature of from about 500 to about 800° C. to form the nanocomposite material.

8. The method according to claim 7, wherein the aqueous solution of the chelating agent is added in a dropwise manner into the aqueous solution of the calcium salt, the cobalt salt, the lead salt and boric acid.

9. The method according to claim 7, wherein:
the calcium salt is selected from the group consisting of calcium sulfate ($CaSO_4$), calcium nitrate ($Ca(NO_3)_2$), calcium chloride ($CaCl_2$) and calcium acetate ($Ca(CH_3COO)_2$);
the cobalt salt is selected from the group consisting of cobalt sulfate ($CoSO_4$), cobalt nitrate ($Co(NO_3)_2$), cobalt chloride ($CoCl_2$) and cobalt acetate ($Co(CH_3COO)_2$); and,
the lead salt is selected from the group consisting of lead sulfate ($PbSO_4$), lead nitrate ($Pb(NO_3)_2$), lead chloride ($PbCl_2$) and lead acetate ($Pb(CH_3COO)_2$).

10. The method according to claim 7, wherein:
the calcium salt is calcium nitrate ($Ca(NO_3)_2$);
the cobalt salt is cobalt nitrate ($Co(NO_3)_2$); and,
the lead salt is lead nitrate ($Pb(NO_3)_2$).

11. The method according to claim 7, wherein the chelating agent comprises at least one hydroxyalkyl carboxylic acid selected from the group consisting of citric acid, tartaric acid, malic acid, mandelic acid and 12-hydroxystearic acid.

12. The method according to claim 7, wherein the chelating agent consists of tartaric acid.

13. The method according to claim 7, wherein the polyol is added in a dropwise manner into the aqueous mixture.

14. The method according to claim 7, wherein the polyol has a number average molecular weight of from about 200 to about 5000 g/mol. and an hydroxyl number of from about 25 to about 500 mg KOH/g.

15. The method according to claim 7, wherein the polyol is selected from the group consisting of: polyester polyols; polyether polyols; poly(ether-ester) polyols; poly(alkylene carbonate) polyols; and, mixtures thereof.

16. The method according to claim 7, wherein the polyol comprises a polyoxy($C_2$-$C_3$)alkylene polyol.

17. The method according to claim 16, wherein the polyol comprises a polyoxy($C_2$-$C_3$)alkylene polyol having a number average molecular weight of from about 200 to about 5000 g/mol. and an hydroxyl number of from about 25 to about 500 mg KOH/g.

18. A method of immobilizing inorganic contaminants disposed in an aqueous medium, the method comprising contacting the aqueous medium with a porous particulate nanocomposite material as defined in claim 1.

19. A method of degrading organic pollutants disposed in an aqueous medium, the method comprising contacting the aqueous medium under actinic irradiation with a porous particulate nanocomposite material as defined in claim 1.

* * * * *